Oct. 23, 1923.　　　　　　1,471,905
T. P. LITTLE
APPLYING CORD FABRIC TO CORES
Filed April 30, 1921
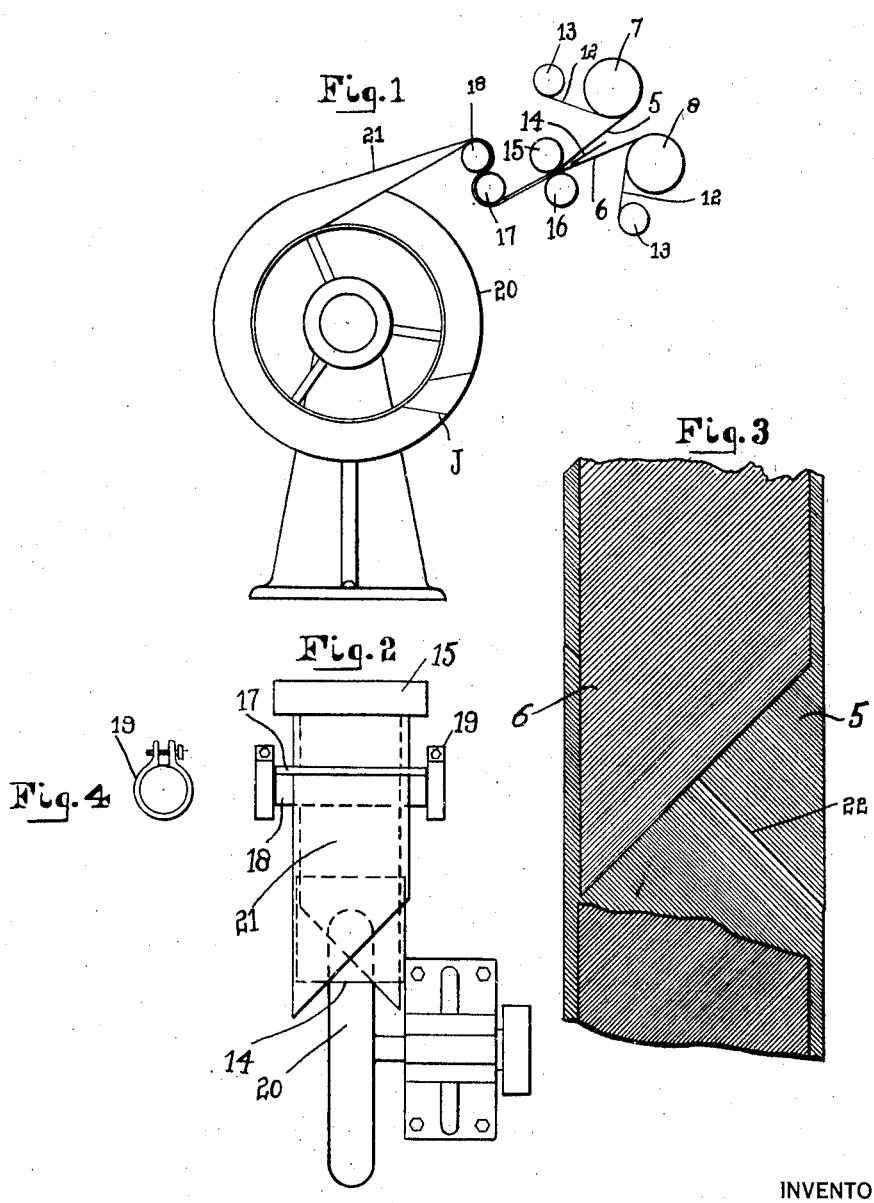
INVENTOR·
Thomas P. Little
BY
Edward C. Taylor
ATTORNEY Patented Oct. 23, 1923.

1,471,905

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

APPLYING CORD FABRIC TO CORES.

Application filed April 30, 1921. Serial No. 465,826.

*To all whom it may concern:*

Be it known that I, THOMAS P. LITTLE, a citizen of the United States of America, residing at Chicopee Falls, in the county of Hampden and State of Massachusetts, have invented certain new and useful Improvements in Applying Cord Fabric to Cores, of which the following is a specification.

My invention is in a new method of making cord tires and in features of the product and apparatus incident to the method. Heretofore cord tires have not been made as conveniently and expeditiously as fabric tires. It is my object to provide a method of making cord tires which will necessitate fewer changes in the building operations and in the machines and tools for assisting in such operations than have heretofore been necessary in changing from the making of the fabric type of tire to the cord type.

The invention will be best understood from the accompanying drawings which illustrate in a purely diagrammatic manner the apparatus and the cord fabric material as arranged to carry out my method. These drawings, taken together with their description, will give a complete understanding of the invention.

In the drawings Fig. 1 is a side view of a power operated tire building core associated with stock rolls, guiding rolls, and tension rolls.

Fig. 2 is a plan view of Fig. 1.

Fig. 3 is a detailed view showing the manner in which the cord fabric is arranged to be fed to the building core and also the type of joint to be made between the ends of each ply of cord fabric in the building operation.

Fig. 4 is a detailed view of a suitable brake to retard the rotation of a tension roll as the strip is fed.

Throughout the specification the term "cord fabric" will be used to indicate the rubberized sheet of strain resisting cords arranged in parallel relation. This cord fabric is to be distinguished from a square woven fabric (in which there are two sets of strain resisting members at right angles with each other) such as used in the manufacture of fabric tires.

Referring to the drawings, the tire builder in carrying out my invention proceeds as follows:

A layer of cord fabric from a suitable stock roll 7 is fed under the guide roll 15 around the tension rolls 17 and 18 and to the core. At the same time a second sheet of cord fabric is led from a separate stock roll 8 over the guide roll 16 around the tension rolls 17 and 18 to the core. It will be noted that the stock rolls 7 and 8 are spaced far enough apart so that the sheets of cord fabric will be joined first between rolls 15 and 16. Furthermore the two sheets of cord fabric joined between said rolls are fed to the core in the form of a two ply strip 21 which constitutes a coherent laminated strip of tire building material. The builder then proceeds with the strip 21 and applies cord fabric to the core 20 in the same manner as if it were square woven fabric. This is possible because as will be noted in Fig. 3 the strain resisting cords of one ply are arranged at a substantial angle to the strain resisting cords of the adjacent ply of cord fabric. The advantage in arranging the cord fabric in the manner stated is found in the fact that strip 21 can then withstand the tension applied to it between the core and the tension roll 18 for example without having the strain resisting cords pulled out of their desired relation.

The tire builder must now make the joint between the ends of each ply on the core. This step in my cord tire building method differs from the operation in a fabric tire building method. As is well known the step of making the joint in building a fabric tire is carried out by cutting the fabric strip of each ply so that its ends may be brought into abutting relation (and sometimes in overlapping relation). This is easy to do when only one ply is wound on the core at a time. The same method cannot be followed when two plies are wound on the core in the manner I have stated. When it is desired to make the corresponding joint in the cord tire it has been thought necessary to build the plies on the core one by one in order to make this joint. This method, however, does not permit of a desired tension as the cord fabric is laid on the core. In order to obtain the desired tension in cord tire building it has been thought necessary to build the plies in the form of a multi-ply flat band on a drum. There the band is applied with proper tension to the core.

According to my invention I shape the ends of the cord fabric plies in the manner shown in Fig. 3 (this type of end when joined with the corresponding end of either strip or the other end of the same strip is called a "fish tail joint"). As the builder is applying the strip 21 to the core 20 and shortly before he is ready to make a joint (in following my invention) he provides between the plies of the strip 21 a liner section 14 which is of suitable area to separate the plies 5 and 6 over the area of the joint and prevent them from sticking together over this area.

Due to the uncertain factors in building tires of the tension applied, the condition of the stock, the size of the growing tire structure and other such things the builder cannot know (if he is building from continuous strips) just where the joint will be made until just before it is necessary to make it. Accordingly, the invention is designed to arrange for the insertion of the liner 14 between the plies of the strip 21 as the plies are fed from the stock roll to the point where they are joined together. As clearly indicated in Fig. 1 the tire builder may insert liner 14 between the plies 5 and 6 at a time when the rotation of the core 20 under the conditions then existing will bring the liner 14 over the area of the joint to be made on the core indicated, for example at the point "J". When the strip 21 is applied to the core so that the liner 14 and the adjacent plies are in condition for the joint to be made, the plies 5 and 6 are cut or torn so that their ends can be brought into abutting relation and complete the fish tail joint. This step is carried out by first cutting the upper or outside ply and turning it back upon itself. This can be accomplished without injury on account of the presence of the liner; then the liner is removed to get at the under or inside ply and the ply is cut so that it can be brought up to its adjacent end (22—Fig. 3.) After the joint is made on the inside ply the corresponding joint is made on the outside ply. Since the strip 21 has been cut in the manner stated, it is ready to be again applied to the core having the ends of its plies in the form shown by Fig. 3 preparatory to repeating the operations as the stock is fed from rolls 7 and 8.

It will be understood that all the usual appliances may be used in a machine adapted for carrying out this invention. In Fig. 1 the wind-up rolls 13 are indicated to take up the liners 12 from stock rolls 7 and 8. In Fig. 3 the two plies of the strip 21 are shown as of different width to better illustrate the presence of two plies. The tension rolls, guide rolls, and stock rolls may all be mounted as is usual on fabric tire building machines upon a turret and moved to position indicated in Fig. 1 when the particular fabric from stock rolls 7 and 8 is desired in a particular stage of the tire building operation. Other rolls corresponding to 7 and 8 but with stock of different widths may be presented to the core 20 in the usual convenient manner well known in tire building machines.

The foregoing description clearly discloses the method of my invention which accomplishes the object of very closely approximating in cord tire manufacture all the conveniences of fabric tire manufacture. For example, the tire builder proceeds substantially the same in building a cord tire as in building a fabric tire except that he inserts the liner 14 at the place where he knows the joint will be made, as he is building the tire. He then makes the "fish tail" joint, or its equivalent, without any difficulty arising from the coherent laminations of strip 21. The invention of the method enables the operator, with practically no effort on his part, to build a cord tire just as conveniently and expeditiously as he is accustomed to build a fabric tire.

The invention is important from an economical point of view because a substantial factor of the extra cost usual in a cord tire as compared to a fabric tire is found in the labor item. This method eliminates a large factor of the extra labor cost by so closely approximating the fabric method.

Having thus described my invention, I claim:

1. The method of building cord tires which consists in laminating a plurality of rubberized cord plies with the cord angles in one ply reversed with respect to an adjacent ply to form a cohesive strip, applying the forward end of said strip under tension to a building core while forming the rear end from said plies, inserting a non-adhesive liner section between the plies as they are being formed into the strip and at spaced intervals determined by the circumference of the core periphery, then breaking the strip on the core at the section where the liner is, making a desired joint between the separate plies of the strip by means of the ends separated by the liner, and completing the tire.

2. A method of facilitating the cutting and splicing of opposed ends of a multi-ply cord fabric strip wherein cords of one ply cross cords of an adjacent ply at a substantial angle, by inserting between the plies of fabric prior to formation of the strip a non-adhesive liner separating adjacent strips over that portion of the strip where it is desired to cut and splice.

3. A cord fabric strip comprising two or more plies of cord fabric stuck together and adapted to be applied to a tire forming core, said strip having non-adhesive liners separating the adjacent plies of the cord fabric at desired intervals.

4. The cord tire building process which consists of forming a two ply cord fabric strip with the cords of one ply crossing cords of the other ply at a substantial angle, by leading two single plies of cord fabric from two separate sources of supply, superimposing one ply upon another and making the two plies adhere firmly together by pressure, subjecting the laminated strip to tension while applying the end of the strip to a tire forming core, placing a non-adhesive liner between the two cord plies forming the strip just prior to the strip formation and at positions along the strip where it will later be desired to cut and splice the cord plies, cutting the strip when it has been applied once around the core, removing the non-adhesive liner, and making a "fish tail" splice between the separated ends of the severed portion of the strip.

THOMAS P. LITTLE.